United States Patent
Schauer et al.

(10) Patent No.: US 7,584,311 B2
(45) Date of Patent: Sep. 1, 2009

(54) ELASTICITY BUFFER RESTARTING

(75) Inventors: Steven A. Schauer, Loveland, CO (US); Timothy D. Thompson, Windsor, CO (US); Christopher D. Paulson, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 1056 days.

(21) Appl. No.: 10/394,893

(22) Filed: Mar. 21, 2003

(65) Prior Publication Data

US 2004/0184405 A1 Sep. 23, 2004

(51) Int. Cl.
*G06F 3/00* (2006.01)
(52) U.S. Cl. .......................................... 710/52; 710/60
(58) Field of Classification Search ....................... None
See application file for complete search history.

(56) References Cited

U.S. PATENT DOCUMENTS

| | | | | |
|---|---|---|---|---|
| 5,805,922 A * | 9/1998 | Sim et al. | ...................... | 710/5 |
| 5,884,099 A * | 3/1999 | Klingelhofer | ................. | 710/52 |
| 6,247,040 B1 * | 6/2001 | Born et al. | .................. | 718/103 |
| 6,401,149 B1 * | 6/2002 | Dennin et al. | ................. | 710/58 |
| 6,625,675 B2 * | 9/2003 | Mann | .......................... | 710/61 |
| 6,842,831 B2 * | 1/2005 | Wilcox et al. | ............... | 711/154 |
| 2007/0044101 A1 * | 2/2007 | Suzuki et al. | ............... | 718/102 |

* cited by examiner

*Primary Examiner*—Alan Chen
(74) *Attorney, Agent, or Firm*—William W. Cochran; Christopher P. Whitham; Cochran Freund & Young LLC

(57) ABSTRACT

An elasticity buffer has a reset input that, when activated, causes the elasticity buffer to temporarily cease operation. When the reset input bit is released, the elasticity buffer may resume operation. During periods when a device on a serial bus may be halted for power saving mode, for example, the serial communication may be reestablished and then the elasticity buffer may be released to continue operation.

13 Claims, 3 Drawing Sheets

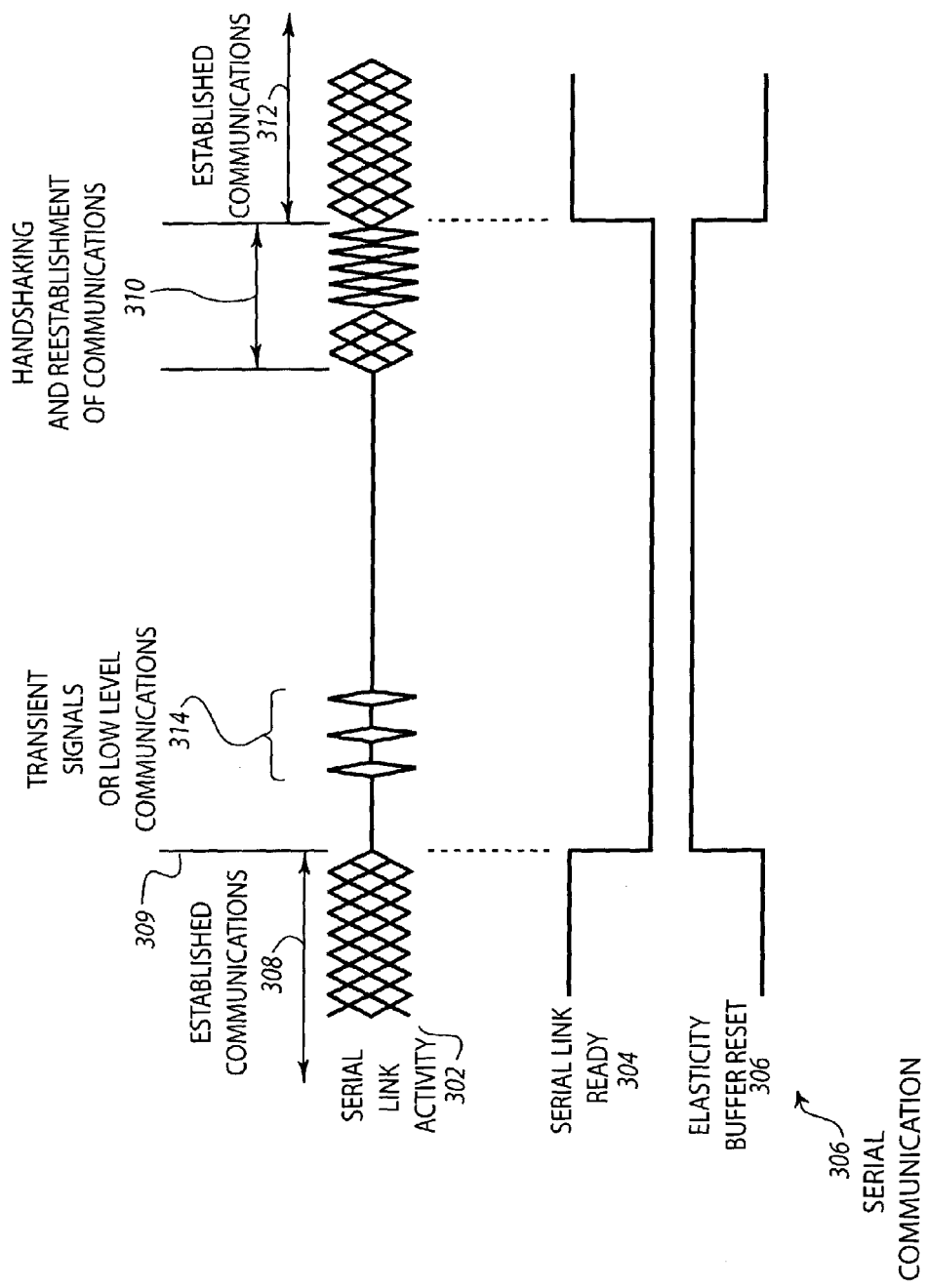

US 7,584,311 B2

ELASTICITY BUFFER RESTARTING

BACKGROUND OF THE INVENTION a. Field of the Invention

The present invention pertains to data transmission systems and specifically to serial data transmissions with elasticity buffers.

b. Description of the Background

Serial communications are commonly used between electronic devices. In cases where two devices must communicate through a continuous serial protocol but the devices do not share a common clock, an elasticity buffer may be provided at one or both ends of the communications link. An elasticity buffer may add or remove null characters from the serial data stream to compensate for slight mismatches between the clock signals of the two devices.

During normal start up and initialization of the serial communication, the serial devices and their associated elasticity buffers begin communication in a known state. Since the elasticity buffer operates by having asynchronous read pointers and write pointers, it is possible that when an elasticity buffer is stopped and restarted that the offset between the read and write pointers may shift. Thus, after repeated stopping and restarting of an elasticity buffer, the pointers of the elasticity buffer may shift to the point where the read and write pointers overlap, causing the elasticity buffer to potentially produce noisy and unreliable data.

When one of the devices is not transmitting, noise on the transmission line may be picked up by the interface containing the elasticity buffer. The noise may be received and processed by the elasticity buffer, potentially causing downstream problems.

In an example of a serial communication between a disk drive and the main processor of a portable computer, a constant serial communication may exist between the disk drive and the main processor. Such a communication may incorporate one or more elasticity buffers. During a period of inactivity, the disk drive may be shut down to conserve electrical power and also may cease transmitting on the serial communications bus. During reestablishment of the serial communication, any problems with the pointers of the elasticity buffer may cause some problems in properly establishing communications. After repeated cessations of transmissions, the chances increase that the elasticity buffer pointers may be misplaced and prone to errors.

It would therefore be advantageous to provide a system and method for pausing an elasticity buffer when there is no activity on a serial communications bus and properly restarting the elasticity buffer when serial communication is reestablished.

SUMMARY OF THE INVENTION

The present invention overcomes the disadvantages and limitations of the prior art by providing a system and method for pausing and restarting an elasticity buffer by providing a signal to the elasticity buffer to pause operation during periods of inactivity. A serial communication detection bit is used to toggle an elasticity buffer pause bit that causes the elasticity buffer to stop. When the serial communications has been reestablished and is operating properly, the elasticity buffer may then be restarted and may continue operating properly.

The present invention may therefore comprise a method for communicating on a serial bus comprising: receiving an input data stream through a communications protocol; passing the input data stream through an elasticity buffer, the elasticity buffer having a pause input that causes the elasticity buffer to pause operation when the pause input is activated; detecting that the input data stream has stopped and activating the pause input of the elasticity buffer; reestablishing the communications protocol; detecting that the communications protocol is reestablished; deactivating the pause input of the elasticity buffer; and receiving the input data stream.

The present invention may further comprise a device for receiving a serial communications comprising: an input for the serial communications; an elasticity buffer connected to the input and capable of receiving the serial communications, the elasticity buffer having a pause input capable of pausing the elasticity buffer when the pause input is activated; and a monitor capable of detecting that the communications is not functioning and activating the pause input, the monitor further capable of detecting reestablishment of the communications and deactivating the pause input of the elasticity buffer.

The present invention may further comprise a communications system comprising: a transmitting device; and a receiving device comprising an input for the serial communications, an elasticity buffer connected to the input and capable of receiving the serial communications, the elasticity buffer having a pause input capable of pausing the elasticity buffer when the pause input is activated, and a monitor capable of detecting that the communications is not functioning and activating the pause input, the monitor further capable of detecting reestablishment of the communications and deactivating the pause input of the elasticity buffer.

The present invention may further comprise a device for receiving a serial communications comprising: a first means for receiving the serial communications; a second means for buffering the serial communications, the second means connected to the input and capable of receiving the serial communications; and a third means for pausing the second means when the third means is activated.

The advantages of the present invention are that a serial communications bus that uses an elasticity buffer may have one of the devices change to a low power mode, cease communications, resume normal power mode, and correctly restart communications. In this manner, the resumption of communication from power saving mode may happen without overruns or other problems associated with improperly restarting the elasticity buffer.

BRIEF DESCRIPTION OF THE DRAWINGS

In the drawings,

FIG. 3 is an illustration of the status lines of an embodiment of a serial communication.

DETAILED DESCRIPTION OF THE INVENTION

Figure 1:
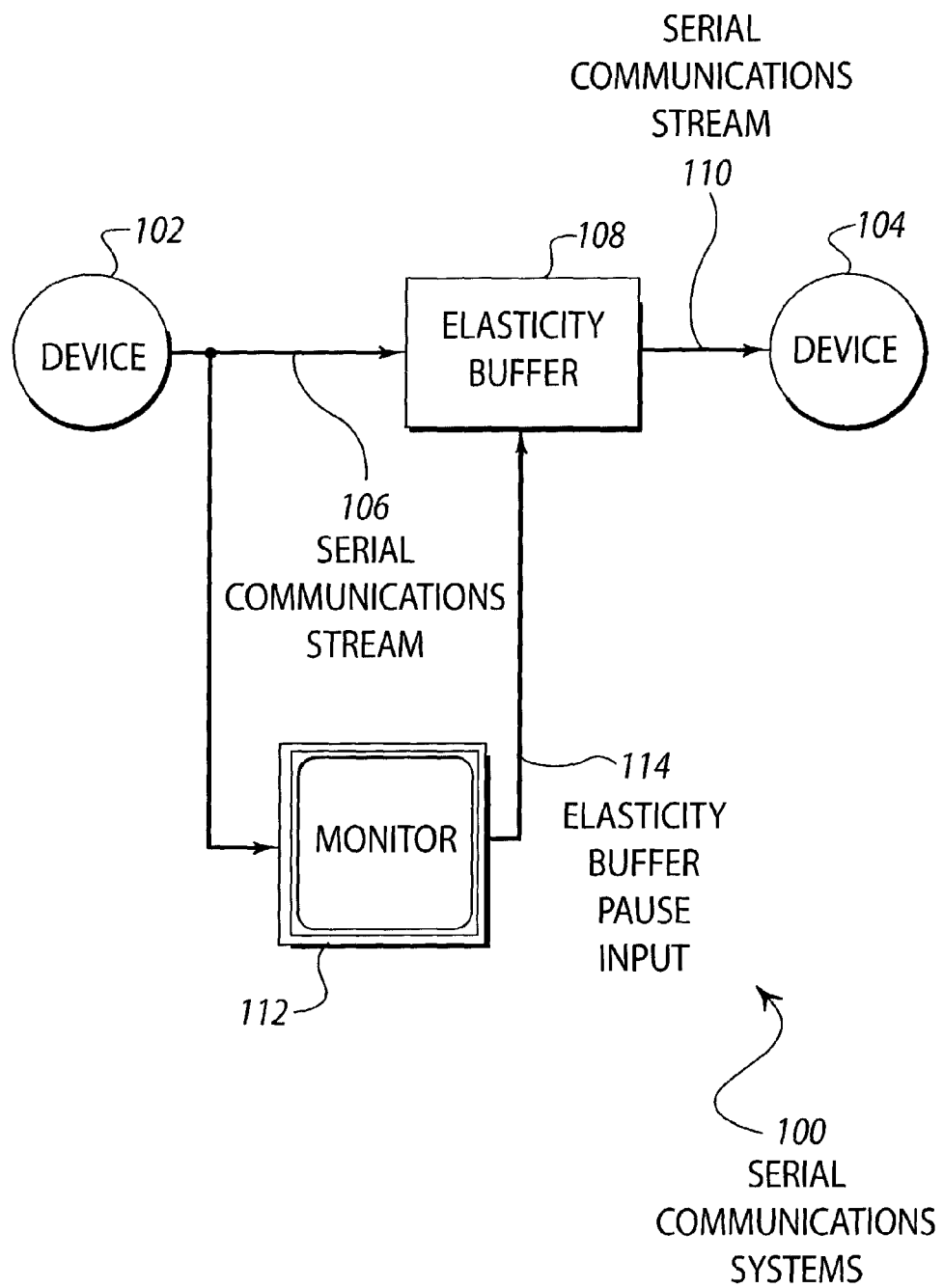
FIG. 1 is a block diagram illustration of an embodiment of the present invention of a serial communications system.

FIG. 1 illustrates an embodiment 100 of a serial communications system. The device 102 and device 104 are communicating using an asynchronous serial communications system. Device 102 sends out a serial communications stream 106 to an elasticity buffer 108 that sends an asynchronous serial communications stream 110 to device 104. A monitor 112 may check for communications stream 106 and cause the elasticity buffer 108 to pause when communications are not properly established by actuating the input 114.

The serial communications streams 106 and 110 may be asynchronous. In other words, the serial communications may not necessarily share a common clock line. The elasticity buffer 108 may compensate for the asynchronous nature of the communication by adding or removing special characters to the data stream. For example, if the incoming data stream is slower than the outgoing data stream, the elasticity buffer may add placeholder or null characters to the outgoing data stream so that the outgoing data stream remains at its speed.

The elasticity buffer 108 may operate by having a specific number of registers and a read pointer and a write pointer. As data blocks come into the elasticity buffer 108, each block may be placed in a register. The write pointer may indicate the register for the next incoming block of data. The write pointer will typically fill up half of the registers with data blocks before the read pointer will begin reading data blocks out of the registers and sending them on the outgoing data stream. The elasticity buffer 108 is an effective method for compensating for jitter between the incoming and outgoing data streams. In a typical application, the speeds of the two data streams are very similar.

The read pointer and the write pointer are asynchronous, since each pointer tracks a different data stream with a different clock or timing. When the elasticity buffer 108 is stopped for any reason, one of the pointers may stop slightly sooner than the other pointer, causing the difference in location between the pointers to shift. Repeated stopping and starting of the elasticity buffer 108 may cause the pointers to become shifted to the point where the read and write pointers are pointing to the same register or they may even switch positions. Such a case may cause the elasticity buffer 108 to corrupt data or to function incorrectly.

The monitor 112 may be able to detect the correct operation of the serial communications stream 106 and may be able to pause the elasticity buffer 108 using the pause input 114. The monitor 112 may be a portion of logic on an integrated circuit or other device for determining proper communications.

The elasticity buffer 108 may have a pause input 114 that causes the elasticity buffer to cease operation while the input is activated. The pause input 114 may cause the read and write pointers to be reset to a known state. In some embodiments, the pause input 114 may cause the elasticity buffer 108 to be cleared so that when restarted, the elasticity buffer 108 may start correctly.

Figure 2:
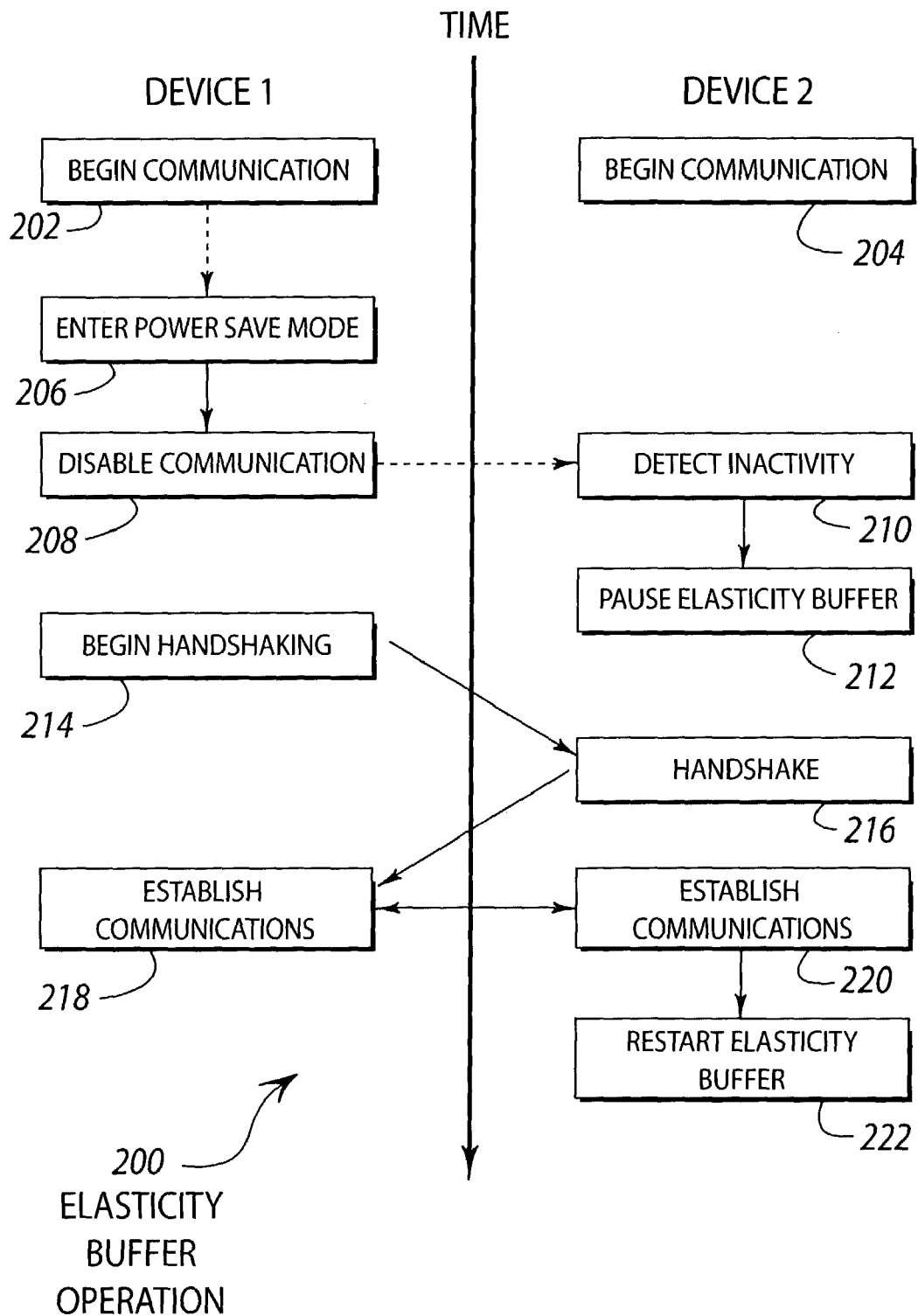
FIG. 2 is a time line illustration of an embodiment of an elasticity buffer operation.

FIG. 2 illustrates an embodiment 200 of an elasticity buffer operation. Device 1 begins communication in block 202 simultaneously with device 2 in block 204. At some later point in time, device 1 may enter a power save mode or otherwise cease communication in block 206. The communication becomes disabled in block 208 and device 2 detects the inactivity in block 210. The device 2 then pauses the elasticity buffer in block 212. At some later point in time, device 1 initiates handshaking in block 214. Device 2 responds with handshaking in block 216 and communications are established in blocks 218 and 220. Device 2 then restarts the elasticity buffer in block 222.

When the elasticity buffer is paused in block 212 and restarted in block 222, the pointers of the elasticity buffer may be reset. In some cases, the elasticity buffer may be cleared and the pointers set to a start up position. In other cases, the pointer positions may be verified and checked so that any problems with overlapping of the pointers may be avoided. Those skilled in the art may use several different methods to pause and restart the elasticity buffer while keeping within the scope and intent of the present invention.

FIG. 3 illustrates an embodiment 300 of a serial communication. The serial link activity is illustrated by line 302. Lines 304 and 306 illustrate serial link ready signal and elasticity buffer reset signal, respectively. During the period 308, communications are established. At point 309, the communications are broken and the serial link ready line 304 changes state. Simultaneously, the elasticity buffer reset line 306 changes state. The initial handshaking 310 and re-established communications 312 may cause the serial link ready line 304 and elasticity buffer reset line 306 to change state.

The elasticity buffer reset line 306 may cause the elasticity buffer to pause operation and may further cause the pointers of the elasticity buffer to be reset to a proper location so that when the elasticity buffer is restarted, it is restarted in a proper manner.

The serial link ready line 304 may be the output line from a hardware state machine or other device that may detect that serial communications are occurring. In some cases, the proper protocol of the communication system may be discriminated against random noise to ensure that the devices are communicating properly. For example, the serial link ready line 304 may ignore transient signals 314 or handshaking 310.

In some embodiments, the elasticity buffer reset line 306 may cause the elasticity buffer to cease any transmission to the receiving device. For example, transient noise signals 314 may be ignored and not transmitted. If the elasticity buffer were functioning when transient signals 314 were received, there is a potential that noise or corrupt data may be received by the elasticity buffer and transmitted to the receiving device.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for communicating on a serial bus comprising:
   receiving an input data stream through a communications protocol;
   passing said input data stream through an elasticity buffer to a receiving device, said elasticity buffer having a plurality of registers that hold data blocks, and said elasticity buffer having a pause input that causes said elasticity buffer to pause operation when said pause input is activated;
   operating said elasticity buffer to temporarily hold data blocks from said input data stream before passing said data blocks to said receiving device in order to compensate for differences in an input data stream clock of said input data stream and a receiving device clock of said receiving device;
   detecting that said input data stream has stopped and activating said pause input of said elasticity buffer;
   reestablishing said communications protocol;
   detecting that said communications protocol is reestablished;
   deactivating said pause input of said elasticity buffer;
   resetting said elasticity buffer when said pause input is deactivated;
   and receiving said input data stream.

2. The method of claim 1 wherein said resetting of said elasticity buffer comprises resetting at least one pointer within said elasticity buffer.

3. The method of claim 1 wherein said resetting of said elasticity buffer comprises clearing said elasticity buffer.

4. The method of claim 1 wherein said elasticity buffer operates by having a write pointer of said elasticity buffer indicate that data blocks from said input data stream should be written to said plurality of registers until a specified subset of said plurality of registers are filled before a read pointer of said elasticity buffer indicates that data blocks should be read from said plurality of registers and passed to said receiving device.

5. A device for receiving a serial communications comprising:
- an input for said serial communications;
- an elasticity buffer connected to said input and having a plurality of registers that hold data blocks that receives said serial communications and temporarily holds data blocks from said serial communications before passing said data blocks to a receiving device in order to compensate for differences in an input serial communications clock of said serial communications and a receiving device clock of said receiving device, said elasticity buffer further having a pause input capable of pausing said elasticity buffer when said pause input is activated and resetting said elasticity buffer when said pause input is deactivated; and
- a monitor capable of detecting that said serial communications is not functioning and activating said pause input, said monitor further capable of detecting reestablishment of said serial communications and deactivating said pause input of said elasticity buffer.

6. The device of claim 5 wherein said pause input is further capable of clearing said elasticity buffer when said pause input is deactivated.

7. The device of claim 5 further comprising a detection mechanism capable of detecting proper serial communications on said input.

8. The device of claim 5 wherein said elasticity buffer operates by having a write pointer of said elasticity buffer indicate that data blocks from said serial communications should be written to said plurality of registers until a specified subset of said plurality of registers are filled before a read pointer of said elasticity buffer indicates that data blocks should be read from said plurality of registers and passed to said receiving device.

9. A communications system comprising:
- a transmitting device; and
- a receiving device having an input for said serial communications;
- an elasticity buffer connected to said input and having a plurality of registers that hold data blocks that receives said serial communications and temporarily holds data blocks from said serial communications before passing said data blocks to said receiving device in order to compensate for differences in an input serial communications clock of said serial communications and a receiving device clock of said receiving device, said elasticity buffer further having a pause input capable of pausing said elasticity buffer when said pause input is activated and resetting said elasticity buffer when said pause input is deactivated; and
- a monitor capable of detecting that said serial communications is not functioning and activating said pause input, said monitor further capable of detecting reestablishment of said serial communications and deactivating said pause input of said elasticity buffer.

10. The communications system of claim 9 wherein said pause input is further capable of clearing said elasticity buffer when said pause input is deactivated.

11. The communications system of claim 9 wherein said receiving device further comprises a detection mechanism capable of detecting proper serial communications on said input.

12. The communications system of claim 9 wherein said elasticity buffer operates by having a write pointer of said elasticity buffer indicate that data blocks from said serial communications should be written to said plurality of registers until a specified subset of said plurality of registers are filled before a read pointer of said elasticity buffer indicates that data blocks should be read from said plurality of registers and passed to said receiving device.

13. A device for receiving a serial communications comprising:
- a first means for receiving said serial communications;
- a second means for elastically buffering said serial communications, said second means connected to said input and having a plurality of registers that hold data blocks that receives said serial communications and temporarily holds data blocks from said serial communications before passing said data blocks to a receiving device in order to compensate for differences in an input serial communications clock of said serial communications and a receiving device clock of said receiving device; and
- a third means for pausing said second means when said third means is activated and for resetting said second means when said third means is deactivated.

* * * * *